United States Patent

[15] 3,700,800

[45] Oct. 24, 1972 de Learie

[54] DRUM-DISPLAY SYNCHRONIZER

[72] Inventor: Frederic C. de Learie, Manlius, N.Y.

[73] Assignee: The United States of America as represented by the Secretary of the United States Air Force

[22] Filed: May 18, 1971

[21] Appl. No.: 144,477

[52] U.S. Cl........178/6.6 DD, 178/6.8, 178/69.5 TV, 340/174.1 A, 340/174.1 P, 340/324 A

[51] Int. Cl........G11b 31/00, H04n 5/04, H04n 5/78

[58] Field of Search..........178/6.6 DD, 6.8, 69.5 TV; 340/174.1 A, 174.1 P, 324 A

[56] References Cited

UNITED STATES PATENTS

| | | | |
|---|---|---|---|
| 3,164,675 | 1/1965 | Buhrendorf | 340/174.1 P |
| 3,396,377 | 8/1968 | Strout | 340/324 A |
| 3,426,344 | 2/1969 | Clark | 340/324 A |
| 3,599,178 | 8/1971 | Jackson | 340/174.1 G |

*Primary Examiner*—Howard W. Britton

*Attorney*—Harry A. Herbert, Jr. and William Stepanishen

[57] ABSTRACT

An apparatus for the synchronization of a drum memory to a display unit utilizing a AFC'd horizontal sync pulse from a television monitor. The start of the horizontal sweep and the video signal are both synchronized to the horizontal sync pulse which is derived from clock pulses on the drum surface.

2 Claims, 1 Drawing Figure

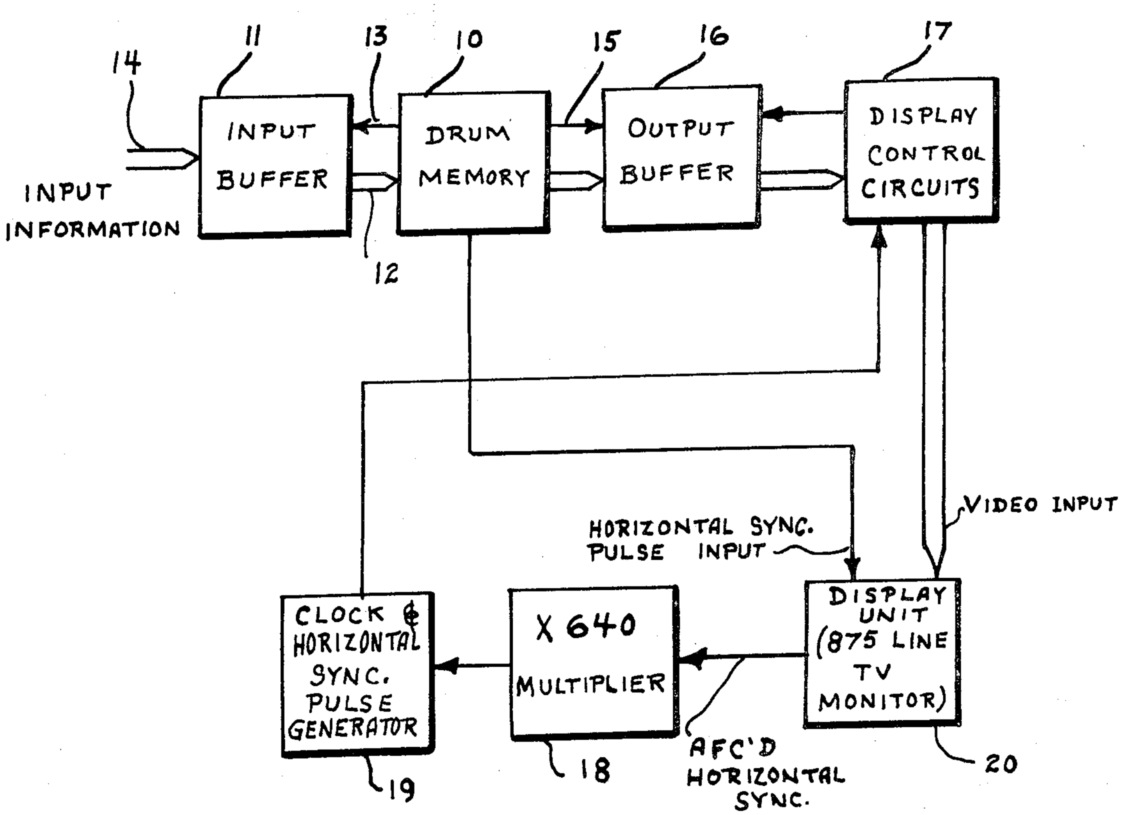
INVENTOR.
FREDERIC C. DE LEARIE
BY Harry A. Herbert Jr. and William Stepanishen
ATTORNEYS

DRUM-DISPLAY SYNCHRONIZER

BACKGROUND OF THE INVENTION

The present invention relates broadly to a drum-display synchronizer and in particular to a display synchronizer apparatus utilizing synchronizing pulses which are derived from the drum memory.

The operation in a digital computer is in time sequences, and the control of this sequence may be either synchronous or asynchronous. In a synchronous computer, each logic operation takes place under the control of the clock, i.e., in synchronism with the clock pulses. At some point a display system is required to read out information which is stored within the computer. One type of display system utilizes the information which is stored on a drum memory to provide a complete display system. However, if the drum memory and the display device are not precisely in synchronism with each other, the picture which is displayed will appear ragged and uneven. The present invention provides a display system to precisely synchronize a drum memory to the display media. cl

SUMMARY OF THE INVENTION

The present invention utilizes a multiplier chain to precisely synchronize the drum memory with the display unit. The television monitor of the display system provides AFC'd a horizontal sync output, the frequency of which is automatically controlled. The frequency controlled horizontal synch output is multiplied in a 64OX multiplier chain to provide a 16.8 megahertz high frequency clock. This high frequency clock is utilized to generate the synchronization pulses and timing gates which are required to display the information from the drum memory. Thus, the start of the horizontal sweep and the control of the video signal is synchronized to the same pulse.

It is one object of the invention, therefore, to provide an improved drum-display synchronizer apparatus which synchronizes the start of the horizontal sweep and the control of the video signal to the same pulse.

It is another object of the invention to provide an improved drum-display synchronizer apparatus utilizing the AFC'd horizontal sync output of the television monitor to obtain a high frequency clock.

It is yet another object of the invention to provide an improved drum-display synchronizer apparatus utilizing a multiplier chain to obtain precise synchronization between the drum memory and the display media.

These and other advantages, objects and features of the invention will become more apparent from the following detailed description when taken in conjunction with the illustrative embodiment in the accompanying drawing, wherein the FIGURE is a block diagram of the drum-display synchronizer apparatus in accordance with this invention.

DESCRIPTION OF PREFERRED EMBODIMENT

Referring now to the Figure, there is shown a drum memory 10 receiving input information from input buffer unit 11 by means of information line 12. The drum memory 10 supplies a control line 13 to the input buffer 11 which enables the buffer 11 to transfer data stored within to the drum memory 10. Input information is applied to the input buffer 11 on information line 14 and is stored temporarily within it until a control signal from the drum memory 10 is received. The double lined arrows, such as 12, 14, indicate information lines, while the single line arrows, such as 13, 15, indicate control lines. The input information which is recorded and stored in the drum memory 10 for utilization in the operation of the computer system (not shown) of which the drum memory is an integral portion, may be displayed as is required on the display unit 20. An output buffer unit 16 is connected to drum memory unit 10 to receive and transfer input information to display control unit 17. Both the drum memory unit 10 and the display control unit 17 provide control lines to the output buffer unit 16. The display control unit 17 is a parallel to serial converter and provides a single video input to the display unit 20. The display unit 20 supplies an automatic frequency controlled horizontal synchronization pulse to the x640 multiplier unit 18. The clock and horizontal sync pulse generator 19 receives a clock control signal from the multiplier unit 18 and provides clock pulses to the display control unit 17. The drum memory unit 10 provides horizontal and vertical sync pulses to the display unit 20.

In the present drum-display synchronizing apparatus the input information is transferred from the input buffer unit 11 to the drum memory unit 10, to the output buffer unit 16, and then to the display unit 20 under the command and at the control of the display control unit 17. Clock pulses which are written on the drum 10 are used to write the contents of the input buffer 11 onto the drum 10 and to read the information stored on the drum 10 into the output buffer 16. The two clocks used for this purpose are a 1.05 MHz main clock and a 52.5 KHz sector clock. The sector clock which is divided by two, is used to drive the horizontal sync input of the TV monitor, display unit 20. The essential part in achieving synchronism between the drum memory 10 and the display unit 20 is the use of a X640 multiplier chain 18. This chain 18 multiplies the automatic frequency controlled horizontal sync pulse from the display unit 20 (the display is shown as a 875 line TV monitor) by a factor of 640 to obtain a 16.8 MHz clock. This clock is shaped in the clock generator 19 and is then applied to the display control unit 17 to achieve synchronism. The 16.8 MHz clock pulses are used in the display control generator 17 to generate the gates which are used to control the time at which the output buffer 16 is displayed.

The start of the horizontal sweep in the display unit 20 is controlled by the automatic frequency controlled horizontal sync pulse, while the video signal to be displayed is under the control of gates in the display control unit 17. The noise which is introduced by the multiplication process is small enough so that negligible jitter is introduced in the display. Thus, both the start of the horizontal sweep and the video signal are synchronized to the automatic frequency controlled horizontal sync pulse from the TV monitor 20 which is in turn derived from clock pulses written on the memory drum 10 surface. The synchronization of a drum memory 10 to a display 20 is accomplished by the use of the automatic frequency controlled horizontal sync pulse of a TV monitor 20 which is derived from clock pulses that are written on the drum 10 surface. The start of the horizontal sweep and the video signal are both synchronized to the automatic frequency controlled horizontal sync pulse. The technique to accomplish this synchronization was to multiply up the automatic frequency controlled horizontal sync pulse in order to obtain a high frequency clock which is needed to control the video signal.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may be used to advantage without a corresponding use of other features.

I claim:

1. A drum-display synchronizer apparatus for synchronization of information from a drum memory presented on a display device comprising in combination:

an input buffer unit to receive and temporarily store input information a drum memory connected to said input buffer to receive said input information, said drum memory providing a control signal to said input buffer to transfer said input information to said drum memory, said drum memory storing said input information, an output buffer unit connected to said drum memory to receive and temporarily store said input information, said output buffer unit receiving a control signal from said drum memory, a display control unit connected to said output buffer unit to receive and parallel-to-serial convert said input information, said display control unit providing a control signal to said output buffer unit, said display control unit providing a video input signal which is representative of said input information, a display unit connected to said display control unit to receive said video input signal, said display unit receiving a horizontal sync pulse input from said drum memory, said display unit belong responsive to said horizontal sync pulse input to provide a horizontal sync pulse, said horizontal sync pulse being automatic frequency controlled, a multiplier unit connected to said display unit to receive said automatic frequency controlled horizontal sync pulse, said multiplier unit multiplying by 640 said horizontal sync pulse to provide a 16.8 megahertz clock signal; and, a clock and horizontal sync pulse generator unit connected to said multiplier unit to receive said 16.8 megahertz clock signal, said clock and horizontal sync pulse generator unit shaping said 16.8 megahertz cloc k signal, said 16.8 megahertz clock signal being applied to said display control unit to generate control gates, said control gates being utilized to control the time said input information in said output buffer unit is displayed.

2. A drum-display synchronizer apparatus as described in claim 1 wherein said display unit comprises an 875 line television monitor.

* * * * *